US010271672B1

(12) United States Patent
Yen et al.

(10) Patent No.: US 10,271,672 B1
(45) Date of Patent: Apr. 30, 2019

(54) INSULATED LUNCH BOX

(71) Applicant: Omielife, Inc., San Francisco, CA (US)

(72) Inventors: Nancy Yen, San Francisco, CA (US);
Lucas Menanix, El Cerrito, CA (US);
Robin Bigio, San Francisco, CA (US)

(73) Assignee: Omielife, Inc., San Francisco, CA (US)

( * ) Notice: Subject to any disclaimer, the term of this patent is extended or adjusted under 35 U.S.C. 154(b) by 0 days.

(21) Appl. No.: 15/231,751

(22) Filed: Aug. 8, 2016

Related U.S. Application Data

(63) Continuation of application No. 14/609,392, filed on Jan. 29, 2015, now Pat. No. 9,414,701.

(60) Provisional application No. 61/933,186, filed on Jan. 29, 2014.

(51) Int. Cl.
| | |
|---|---|
| *B65D 25/04* | (2006.01) |
| *A47G 23/04* | (2006.01) |
| *B65D 43/16* | (2006.01) |
| *A45C 11/20* | (2006.01) |
| *A45C 13/02* | (2006.01) |
| *A47J 41/00* | (2006.01) |
| *B65D 45/02* | (2006.01) |

(52) U.S. Cl.
CPC .............. *A47G 23/04* (2013.01); *A45C 11/20* (2013.01); *A45C 13/02* (2013.01); *A47J 41/0072* (2013.01); *B65D 25/04* (2013.01); *B65D 43/16* (2013.01); *B65D 45/02* (2013.01)

(58) Field of Classification Search
CPC .... B65D 25/108; B65D 25/04; A47J 41/0088; A47J 41/0072; A47G 23/04; A45C 11/20; A45C 13/02

USPC ....... 220/23.83, 23.86, 23.89, 592.17, 592.2, 220/592.27; 62/457.1
See application file for complete search history.

(56) References Cited

U.S. PATENT DOCUMENTS

| | | | |
|---|---|---|---|
| 1,486,450 | A | 3/1924 | Peterman |
| 2,633,264 | A | 3/1953 | Dinsmore et al. |
| 2,718,973 | A | 9/1955 | Dahl et al. |
| 4,250,998 | A | 2/1981 | Taylor |
| 4,346,813 | A | 8/1982 | Cho et al. |
| 4,845,959 | A | 7/1989 | Magee |
| 5,579,932 | A | 12/1996 | Drozd et al. |
| 6,530,496 | B2 | 3/2003 | Moran |
| 7,861,552 | B1 | 1/2011 | Hughes |
| 8,061,547 | B2 | 11/2011 | Camp, Jr. |

*Primary Examiner* — Stephen J Castellano
(74) *Attorney, Agent, or Firm* — Loginov & Associates, PLLC; William A. Loginov

(57) ABSTRACT

A food storage container is disclosed. The food storage container has a one or more water tight compartments. The food storage container can have an insulated component that can maintain food at substantially constant temperature over a relatively long period of time. The insulated component can be secured to the food storage container with a securing insert that prevents the insulated component from moving or rotating when in use. The insulated component can be removed. The insulated component can have a lid with an opening lever feature that makes it easy for users to open the lid. The food storage container can have a removable divider that can be used to create a plurality of smaller compartments. The food storage container can have a latch and hinge assembly to close the lid and tray. The food storage container can have an integral handle to provide a carrying solution.

13 Claims, 11 Drawing Sheets

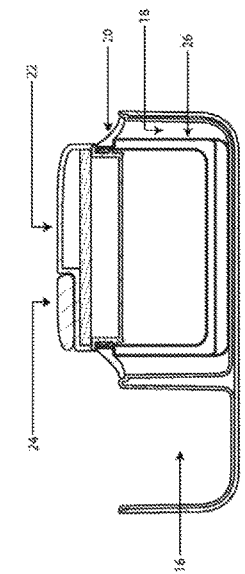
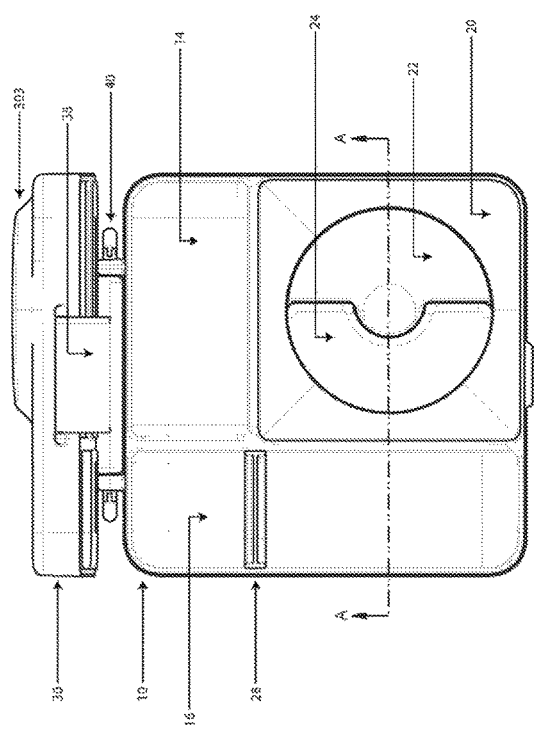
FIG. 5
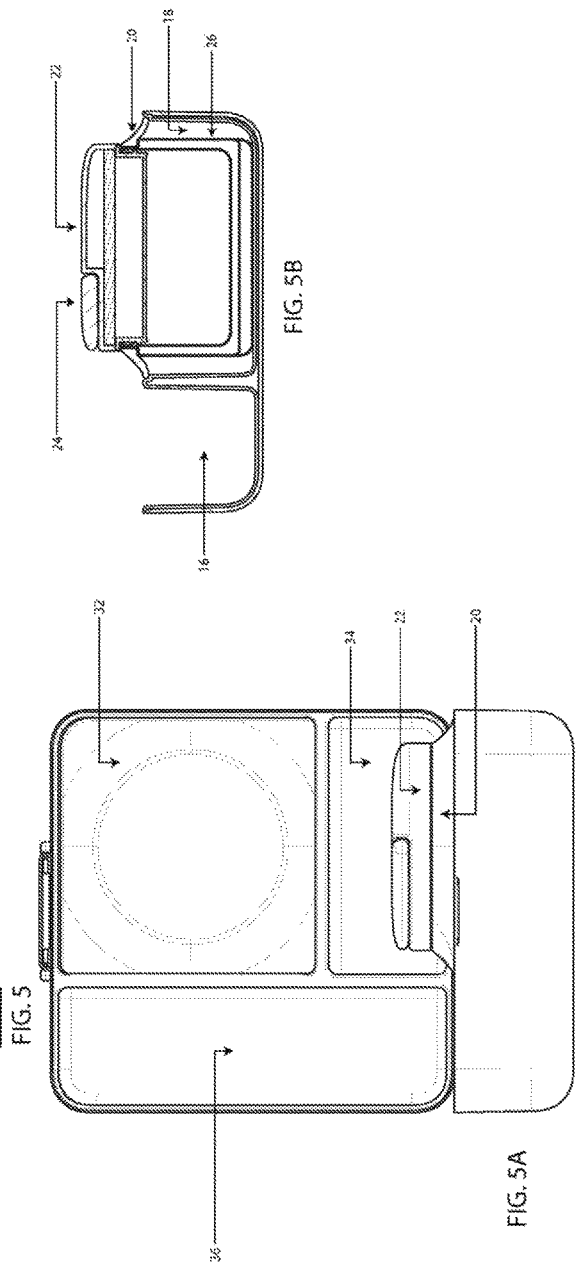
FIG. 5A
FIG. 5B

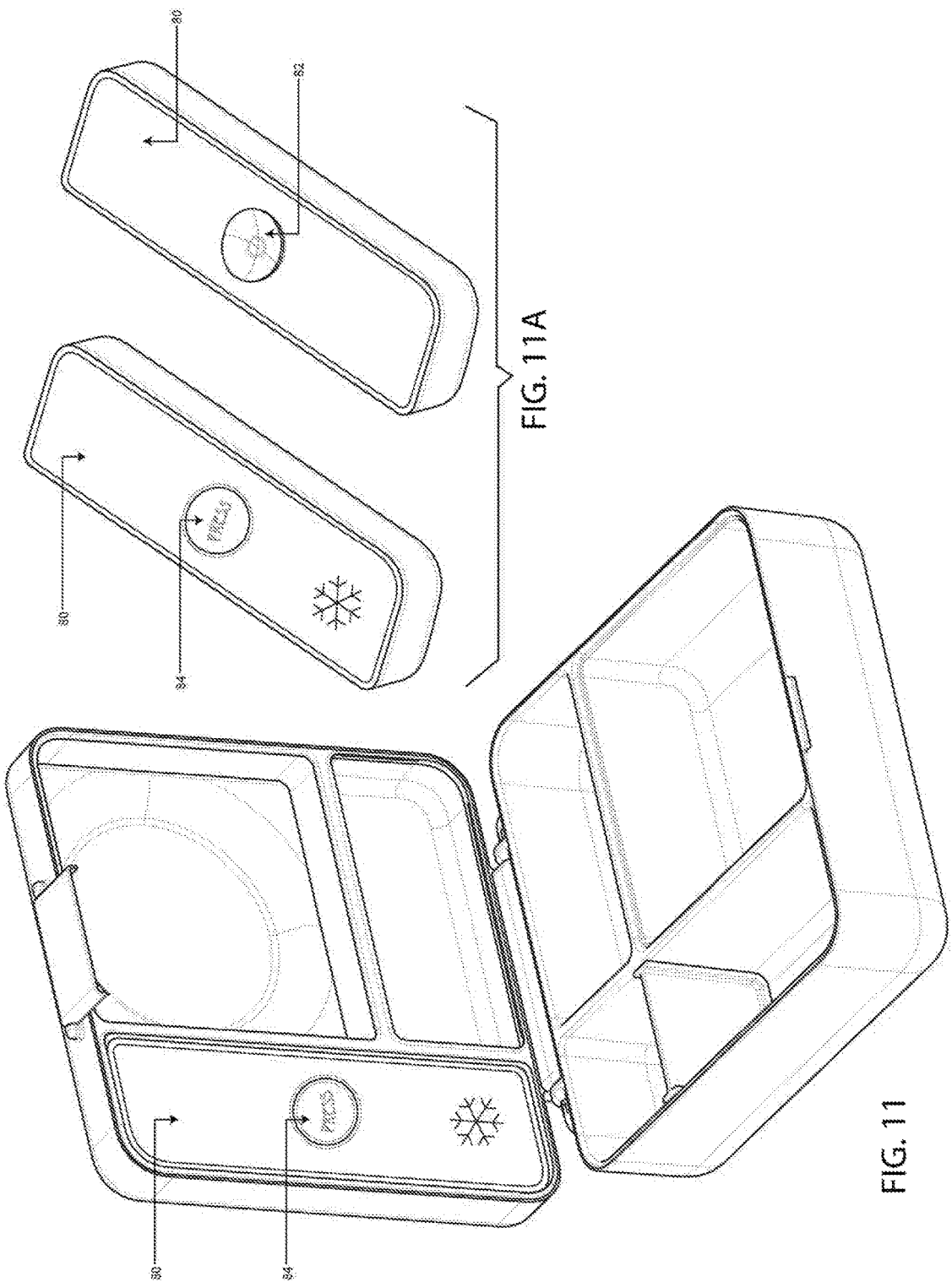

INSULATED LUNCH BOX

RELATED APPLICATIONS

This application is a continuation of U.S. patent application Ser. No. 14/609,392, filed Jan. 29, 2015, entitled INSULATED FOOD STORAGE CONTAINER, now U.S. Pat. No. 9,414,701, which claims the benefit of U.S. Provisional Application Ser. No. 61/933,186, filed Jan. 29, 2014, entitled INSULATED LUNCH BOX, the entire disclosure of each of which applications is herein incorporated by reference.

FIELD OF THE INVENTION

The present disclosure relates to a food storage container.

BACKGROUND OF THE INVENTION

As nutritional awareness increases, so too does the desire for consumers to prepare and eat their own food outside of their dwelling. Such home-prepared food can include hot, cold, and/or room temperature items, as well as food items that are preferably kept separate from one another, e.g., liquids and solids. Certain prior art food storage systems allow for mixing of food items in a single container, while other prior art food storage systems are not configured to maintain the temperature of items that are preferably kept hot and/or cold.

SUMMARY OF THE INVENTION

The present invention is a food storage container with separate interior compartments, an insulated component for the storage of hot or cold food, and an integral lid. The container versatile and durably allows for the storage of a variety of hot and cold food products and vessels, as well as utensils, making it suitable for a wide range of portable meal activates and locations.

The food storage container can be a durable, reusable food container for transport and storage of meals. The food storage container can be constructed of hard materials, for example, plastic, to protect food from becoming damaged during transport. The food storage container can be self-contained. The food storage container can transport food and serve as a food serving surface.

The food storage container can prevent the comingling of food by having extruded, internal compartments with walls that are flush with the perimeter of the food storage container. The compartments can be water tight by having the dividing walls seal against the box lid by compressing a soft material, for example, TPU, TPE or silicon, between the tray and the box lid. The box lid can have a feature made of a soft material, for example, TPE, which can hold utensils.

The food storage container can have a removable divider that can be used to divide the compartments into a plurality of compartments.

The food storage container can have an insulated component that maintains food at a substantially constant temperature over a relatively long period of time.

The insulated component can have a threaded lid with an opening lever. The opening lever can provide leverage when opening the threaded lid, thereby beneficial to people who lack hand strength due to age or disability, or children who have small hands.

A securing insert can secure the insulated component in the food storage container. The securing insert can prevent the insulated component from moving side to side when the food storage container is in use. The securing insert can also prevent the insulated component from rotating in a circular motion or coming out of the bottom tray when the user is attaching or removing the lid.

The food storage container can have an extruded shape on the box lid, in one example the shape can be mesa-shaped, e.g., a flat top with steep sides or frustoconical, to accommodate for the excessive height of the assembled insulated component with lid that juts out above the height of the bottom tray. The extrusion can have decorative features, for example, graphic, logos, or monograms.

The insulated component can be removed when hot or cold food is not desired. Once removed, the evacuated space can be used to store room temperature foods, for example, a sandwich.

The food storage container can have a latch and hinge assembly to close the lid and tray. The compression force can create a water tight seal between the upper box lid and the bottom tray of the food storage container.

The food storage container can have an integral handle to provide a carrying solution.

In an illustrative embodiment, a food storage system comprises a food storage container defining a plurality of compartments. A securing insert is configured to be received within a first compartment of the plurality of compartments, and an insulated component is configured to engage with the securing insert such that the insulated component is secured within the first compartment of the plurality of compartments. The container can further include an insulated component lid that engages with the insulated component to form a water-tight seal, and the lid can define an upwardly extruded shape to accommodate the insulated component lid. The container can further include a tray that defines the plurality of compartments. The tray and the lid can form a water-tight seal between the plurality of compartments and with respect to an exterior of the food storage container when the food storage container is configured in a closed position. Illustratively, the lid can define a plurality of lid compartments corresponding to the plurality of compartments, and the first lid compartment can includes a utensil holder. The system can also include at least one icepack configured to be received by at least one of the plurality of lid compartments. Additionally, the insulated component lid can comprise an opening lever configured to rotate 90 degrees. Illustratively, the securing insert can include a plurality of inner threads that engage with the insulated component and a plurality of outer threads that engage with the insulated component lid; and the insert can define a shape that corresponds to a shape of the first compartment. The container can also include a removable divider that divides at least one of the plurality of compartments into a plurality of sub-compartments. Also illustratively, the insulated component can comprise an inner wall and an outer wall, with an insulating material disposed therebetween. The insulating material can comprise at least one of: air, STYROFOAM® (expanded polystyrene), and a plastic honeycomb, and a vacuum.

BRIEF DESCRIPTION OF THE DRAWINGS

The invention description below refers to the accompanying drawings, of which:

FIGS. 5, 5A and 5B, respectively, show an aerial view, a side view, and a cross sectional view of the food storage container of FIG. 1;

FIGS. 7 and 7A, respectively, show an exterior view and a side profile of the food storage container of FIG. 1;

FIG. 11 is a perspective view of the food storage container in an open configuration showing an ice mounted in the lid thereof in an associated compartment; and FIG. 11A is a top and bottom perspective view of the ice pack of FIG. 11.

DETAILED DESCRIPTION

Figure 1:
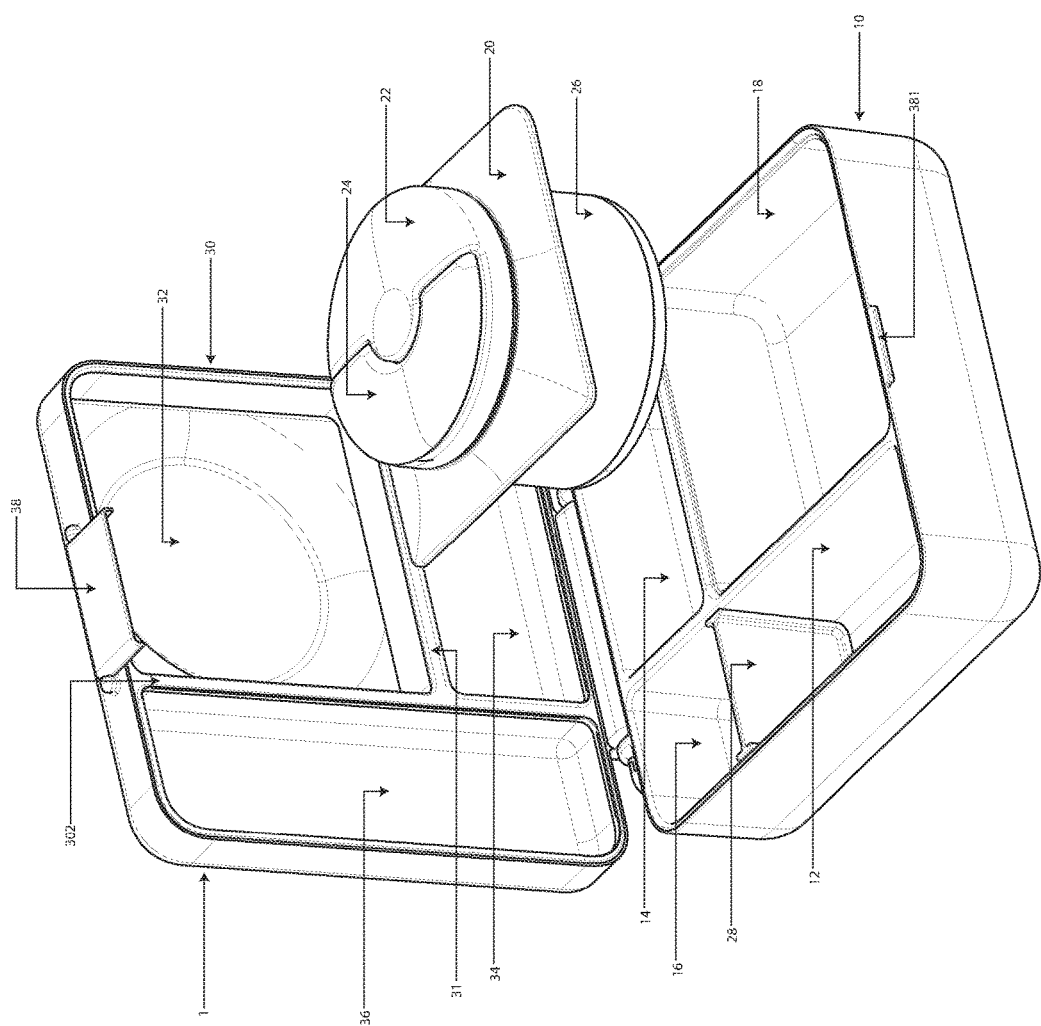
FIG. 1 is an open configuration of the food storage container.

FIG. 1 illustrates a food storage container 1 in an opened configuration. The food storage container is configured to store any kind of food or drink product. The food storage container 1 can have a first housing and a second housing. The first housing can be a door, lid or bottom tray 10. The second housing can be a door, tray or upper box lid 30, for example, able to cover the bottom tray 10. The first and/or second housings can be made from durable materials, for example, hard plastic.

The bottom tray 10 can have one or more dividing walls 12. The dividing walls 12 can divide the bottom tray 10 into a plurality of compartments 14, 16, 18. Although three compartments are depicted, it is expressly contemplated that bottom tray can be divided into any number of compartments, such as two or more. Each of the compartments 14, 16, 18 can have a depth for receiving food of various size and shape. The dividing walls 12 of the bottom tray 10 can be formed by the downward extrusion of compartments 14, 16, 18 so a top surface of the dividing walls 12 can be flush with the top surface of the perimeter of the tray. This configuration can prevent migration of food product among compartments 14, 16, and 18 while the container 1 is in the closed configuration.

The box lid 30 can have one or more dividing walls 31. The dividing walls 31 can divide the box lid 30 into a plurality of lid compartments 32, 34, 36 or compartments. The lid compartments 32, 34, 36 can be located in corresponding opposition to the downwardly extruded compartments 14, 16, 18 respectively, of the bottom tray 10. For example, lid compartment 32 can correspond to compartment 18, lid compartment 34 can correspond to compartment 14, and lid compartment 36 can correspond to compartment 16. In one example, the lid compartment 36 can have a cover (not shown) that allows it to store utensils. The cover would prevent the utensils from touching foods stored in compartment 16.

In one example, an insulated component 26 is a double wall structure of generally cylindrical construction having an inner wall and outer wall. An airtight chamber is defined in the area between the walls. The airtight chamber can be filled with insulating material, for example, air, STYROFOAM® (expanded polystyrene), a plastic honeycomb or combinations thereof. The airtight chamber can also be evacuated of air, thereby creating a vacuum in a manner well known in the art.

An insulated component lid 22 can be made from durable materials, for example, a metal such as steel, or a hard plastic. The volume between the inner surface and outer surface of the lid can be filled with insulating material, for example, STYROFOAM® (expanded polystyrene), plastic, air, a vacuum, or a combination thereof. The insulated component lid 22 can have a threaded rim that screws into a corresponding threaded inner rim of the insulated component 26 to create a water tight seal with elastomeric sealing gasket 21.

An opening lever 24 can be affixed to the insulated component lid 22 through two axle pins (not shown) which allow the opening lever 24 to rotate 90 degrees relative to the position of the lever 24 shown in FIG. 1. The opening lever 24 can provide leverage when opening the insulated component lid 22, which is beneficial for disabled or elderly adults who lack hand strength, or for children who have small hands.

The insulated component 26 can engage with a securing insert 20. In one example, the securing insert 20 can be sized and/or shaped so as to correspond to a size and/or shape of at least one of the compartments 14, 16, or 18 of the container 1. In this example, the securing insert 20 is generally square-shaped so as to correspond to a square-shaped compartment 18. The corresponding shape of insert 20 and compartment 18 allows the securing insert 20 to hold the insulated component 26 securely within compartment 18. The securing insert 20 also prevents the insulated component 26 from rotating in a circular motion when the user is screwing or unscrewing the threaded lid 22. The securing insert 20 also prevents the insulated component 26 from falling out when the food storage container is in use by virtue of a tight fit between the securing insert and the internals walls of the compartment 18.

A removable divider 28 can divide at least one of the compartments 14, 16, or 18 into a plurality of smaller sub-compartments. In this example, the divider 28 is provided in compartment 16, thereby dividing the compartment 16 into two smaller sub-compartments. In one example, the removable divider can have a notch (not shown) that can be used to store utensils.

A unitary or integral latch assembly 38 can lock the food storage container in the closed configuration. The latch assembly can have features that create an interference fit between the latch assembly 38 and a latch hook 381. This interference fit can create the compression force needed to create the water-tight seal between the upper box lid 30 and the bottom tray 10. The latch assembly 38 can have decorative features, for example, a sticker, laser etching, or embossing. While latch assembly 38 is depicted, other methods or configurations capable of securing a water-tight fit between lid 30 and tray 10 are contemplated. For example, any number of tab or clamp assemblies, or engagement features, can be employed. In other examples, the latch assembly can be positioned at any other position on the food storage container to ensure a water tight seal.

Figure 2:
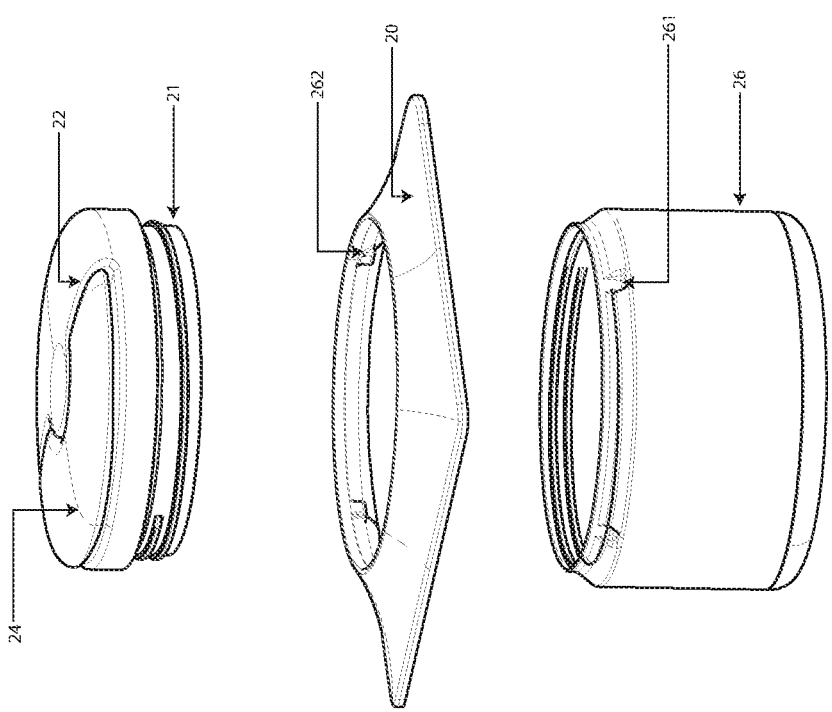
FIG. 2 is an exploded view of the insulated component of the food storage container of FIG. 1.

FIG. 2 is an exploded view of the insulated component 26, securing insert 20, and insulated component lid 22. In one example, the insulated component 26 can have negative (recessed) locking features 261 near the downward sloping section of the upper rim. The securing insert 20 can have positive (projecting) locking features 262 that engage with the negative locking features 261 in the insulated component 26. The engagement of the negative locking feature 261 and the positive locking feature 262 interengage, and thereby prevent the insulated component 26 from rotating in a circular motion when the user is screwing on or off the threaded lid 22 from the insulated component 26.

In another example, the securing insert 20 can be permanently, semi-permanently, or temporarily bonded to insulated component 26, for example, with an adhesive, welding and/or a snap mechanism.

In yet another example, the insulated component 26 can have positive locking feature at its base. The compartment 18 can have negative locking features that engage with the positive locking features at the base of the insulated component 26. This can allow the insulated component to be secured directly to the container 1 within compartment 18 without (free-of) the need for an intermediate securing insert 20.

In yet another example, the securing insert 20 can be a structure having four walls and a base, all adjoined at the edges to form a cube. The cube shaped securing insert can have positive locking features that engage with negative locking features along the base and walls of compartment 18, thereby preventing the insulated component 26 from rotating when the user is screwing on or off the threaded lid.

In yet another example, the diameter of the insulated component 26 is equal to the width of compartment 18. The insulated component 26 can have positive locking features that engage with directly with the negative locking features along the walls of compartment 18.

The edges of the securing insert 20 can be flush with the walls forming compartment 18, and the securing insert 20 can be friction fit into compartment 18. This example is shown in greater detail below with respect to FIG. 9.

In another example, the securing insert 20 can have an elastomeric sealing gasket, either as a separate part or cold molded directly onto the securing insert along the edges. The elastomeric sealing gasket can be compressed between the securing insert 20 and compartment 18 to create a tight fit. The gasket can be constructed from a variety of pliable materials that should be clear to those of skill.

In yet another example, compartment 18 has positive locking features in its walls that engage with negative locking features in the securing insert 26. The engagement of the positive and negative locking features holds the securing insert 26 securely in compartment 18.

The insulated component lid 22 has an elastomeric sealing gasket 21 which can render the insulated component 26 water tight. The gasket can be formed from a variety of pliable materials that should be clear to those of skill.

Figure 3:
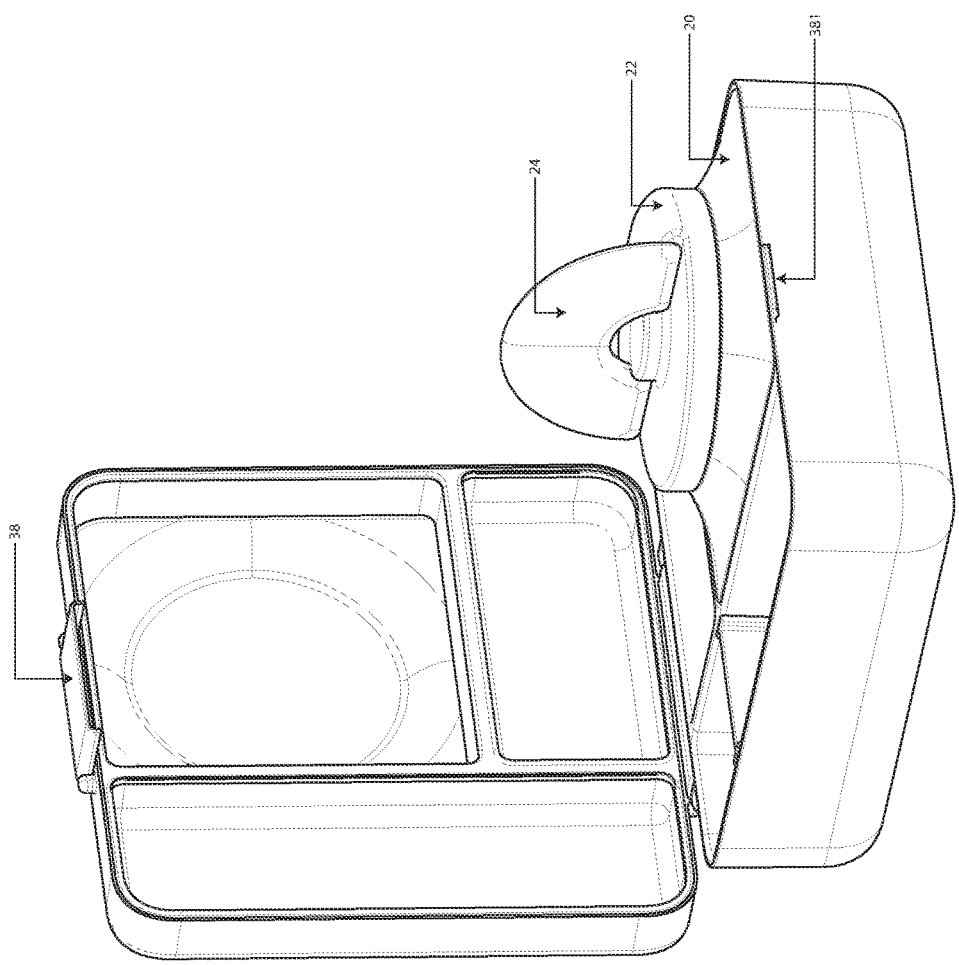
FIG. 3 is an illustration of the opening lever of the insulated component of FIG. 2 in upright position.

FIG. 3 shows the opening lever 24 rotated to a 90-degree angle to provide leverage when opening insulated component lid 22. Threaded lids can be difficult to open for people with weak hand strength, for example, elderly people, disabled/physically challenged people, or children. The opening lever 24 can provide leverage when opening the threaded insulated component lid 22. Users can flip the opening lever 24 to an approximately 90-degree angle and push the opening lever in a clockwise motion with their fingers rather than grasping and rotating the circular lid with their hands. Note that the extension to a 90-degree (or right) angle is exemplary of a range of projection angles based on functionality and appearance.

The opening lever 24 is attached to the insulated component lid 22 through two axle pins (not shown). When the opening lever 24 is not in use, it can fold down into the recessed section of the insulated component lid 22. Once folded down, the opening lever is flush with the insulated component lid 22 to define a clean surface profile that avoids snagging on external objects. As depicted, the opening lever 24 has a substantially C-shaped profile. In other examples, the opening lever can have any shape, such as L-shaped, U-shaped, etc.

In one example, the opening lever 24 can have a visual or sensory indicator, for example, a red arrow or raised dots, which indicates to the user which direction to turn the handle in order to open the lid.

In another example, the opening lever 24 can include/define a unitary or integral interference mechanism that ensures users fold it down in the correct direction.

Figure 4:
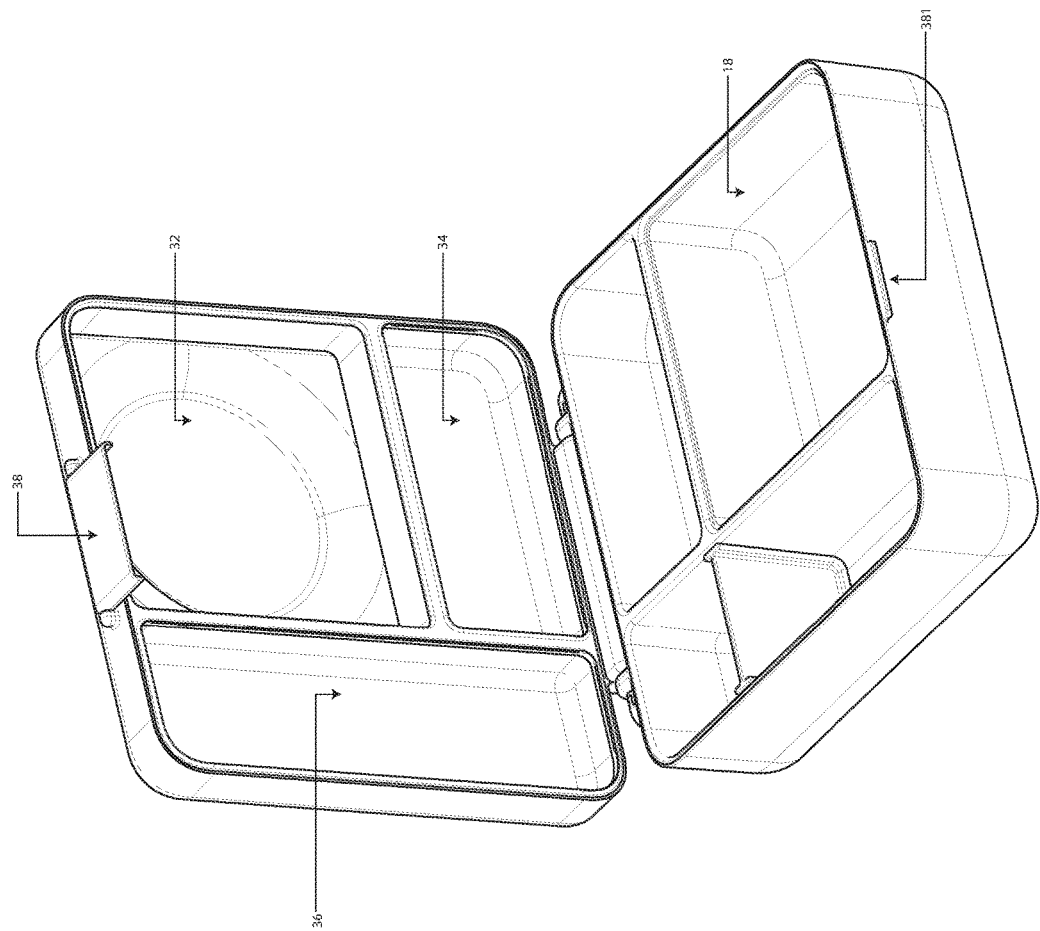
FIG. 4 is an open configuration of the food storage container of FIG. 1 showing compartments without (free-of) the insulated component therein.

FIG. 4 shows the food storage container 1 when the insulated component 26 and the securing insert 20 is removed. Compartment 18 can be used to store room temperature foods, for example, sandwiches. The insulated component 26 can be used with the food storage container, or on its own. In one example, ice packs made of a hard material, for example, plastic, can be pressure fit into each of the lid compartments 32, 34, 36. This example is shown in greater detail below with respect to FIG. 11.

FIG. 5 provides an aerial view of food storage container 1 in open position. A hinge assembly 40 can be integrally formed by the meeting of the edges of the top box lid 30 and the bottom tray 10. The hinge assembly 40 can allow the upper box lid 30 to rotate open and stay secured to the bottom tray 10.

FIG. 5A depicts a side profile of the food storage container 1 in open position with the insulated component 26 locked into compartment 18 using the securing insert 20. The securing insert 20 and the insulated component lid 22 jut out above the edge of the bottom tray 10. An upwardly extruded shape 303 in the upper box lid 30 is in corresponding opposition to the securing insert 20 and the insulated component lid 22. The upwardly extruded shape 303 can be any type of shape to accommodate the lid 22. For example, the shape 303 can be in the form of a mesa, e.g., a flat topped surface having steep walls or frustoconical. In other examples, the shape 303 can have any type of shape corresponding to a shape of the lid 22 The upwardly extruded shape 303 provides additional height in the upper box lid 30 to accommodate the excessive height of the securing insert 20 and the insulated component lid 22.

In another example, the walls of the bottom tray 10 can be flush with the insulated component lid 22.

FIG. 5B is a cross sectional view of the food storage container 1. The insulated component 26 sits in compartment 18 and is held in place by the securing insert 20 which prevents the insulated component 26 from moving or rotating when the food storage container is in use. The edges of securing insert 20 are flush with the walls of compartment 18. The threaded inner rim of the securing insert 20 engages with the threaded rim of the insulated component lid 22. The opening lever 24 is folded down and sits flush with insulated component lid 22.

Figure 6:
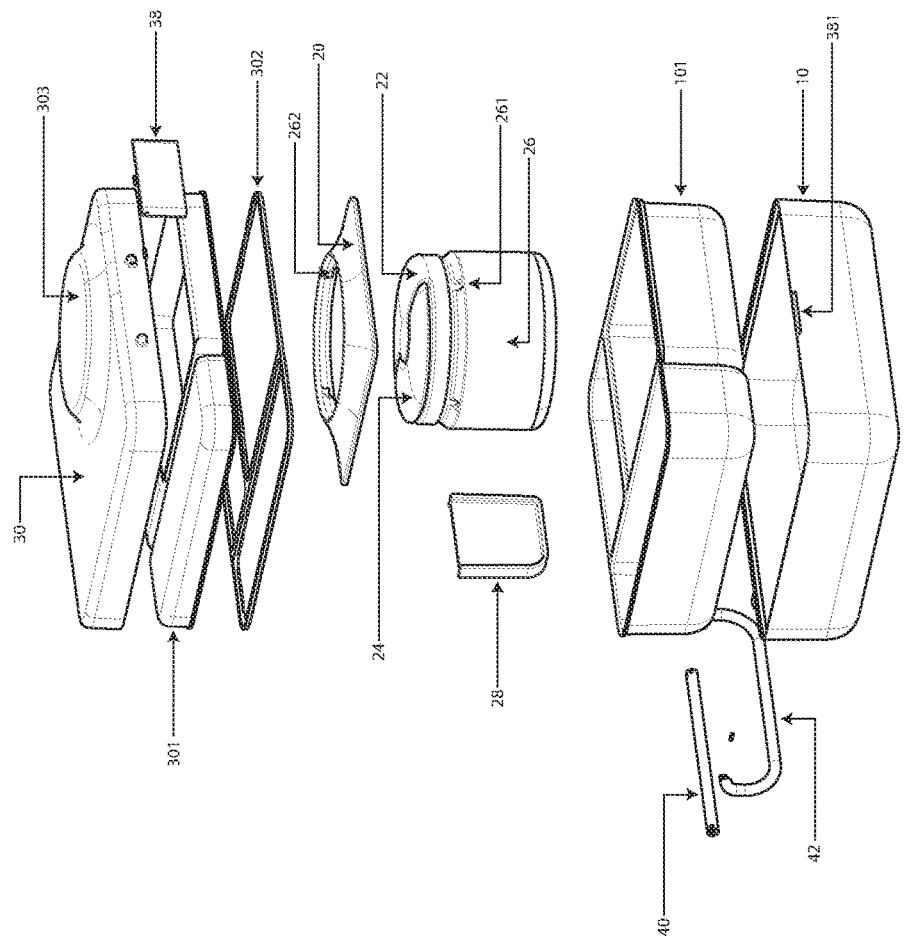
FIG. 6 is an exploded view of the food storage container of FIG. 1.

FIG. 6 is an exploded view of the food storage container assembly. The upwardly extruded shape 303 is in corresponding opposition to the fully assembled insulated component 26. The upward extruded shape 303 can have decorative features, for example, a logo, graphic or monogram. These decorative features can be (e.g.) screen-printed, applied (e.g. a decal) or molded into the material. Box lid 30 can be bonded to inner lid 301 with, for example, adhesive or sonic welding. The top surface of the dividing walls 12 of the bottom tray 10 can seal against the box lid 30 by compressing a gasket made of a soft material, for example, silicone TPE (thermoplastic elastomer) or TPU (thermoplastic polyurethane), between an inner bottom tray 101 and the inner box lid 301. The gasket 302 can create a water tight seal around the outer perimeter of the food storage container 1, as well as between the compartments 14, 16, 18.

The securing insert 20 has positive locking features 262 that engages with negative locking features 261 on the insulated component 26 to keep the insulated component from rotating when the user screws on or off the threaded insulated component lid 22.

The removable divider 28 can be constructed of a hard and/or semi-rigid material, for example, plastic (e.g. acrylic, polycarbonate, ABS, PVC, PET, polypropylene or polystyrene). The removable divider 28 can also have soft material, for example, TPU or silicone, over molded to the two side edges in order to make the barrier water tight. The removable divider 28 can be used when additional compartments are desired. The removable divider 28 provides an effective separating barrier between foods, thus preventing foods from comingling.

The inner tray 101 and be bonded to the bottom tray 10 with, for example, adhesive, interengaging locking structures and/or sonic welding. This advantageously creates a voluminous space between the tray 101 and tray 10 to allow additional insulation for the contents of the compartments.

Figure 7:
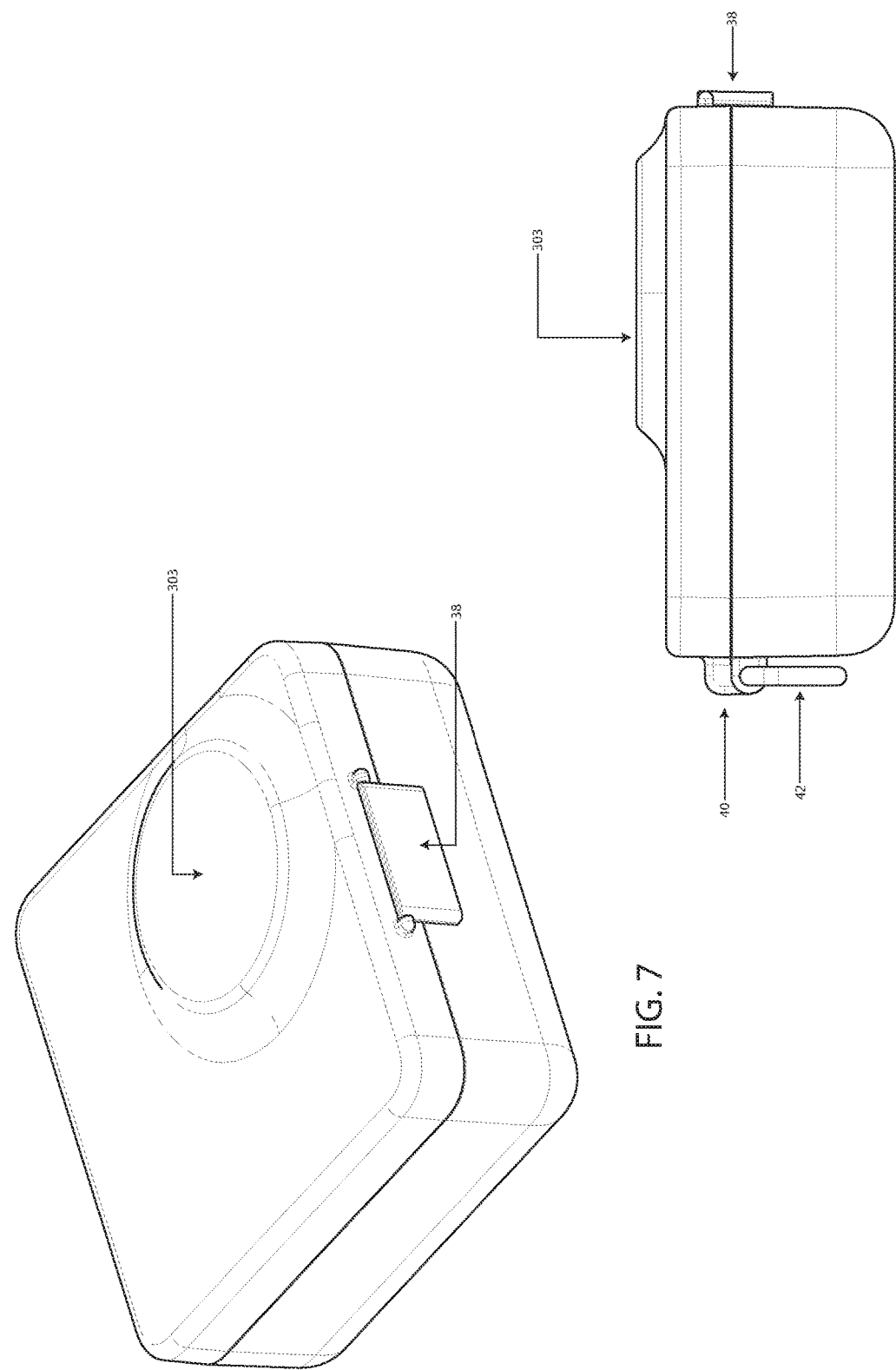

FIG. 7 is a top view of the food storage container 1 in closed position. The upwardly extruded shape 303 accommodates the excessive height of the fully assembled insulated compartment 26 with the securing insert 20 and insulated component lid 22.

FIG. 7A is a side profile of the food storage container 1 in closed position. A handle 42 is integrated to the hinge assembly 40. The handle 42 can be in line with the hinge assembly 40 and can rotate approximately 90 degrees. The handle 42 can provide a carrying solution for the food storage container. Although depicted at a surface opposed to the latch assembly 38, any type of handle can be employed to allow for easy transport of the food storage container. In one example, a strap or latch can be employed, allowing a user to wear the container in the manner of a satchel. Other exterior components can be employed to create easy transport, such as wheels to allow for rolling.

Figure 8:
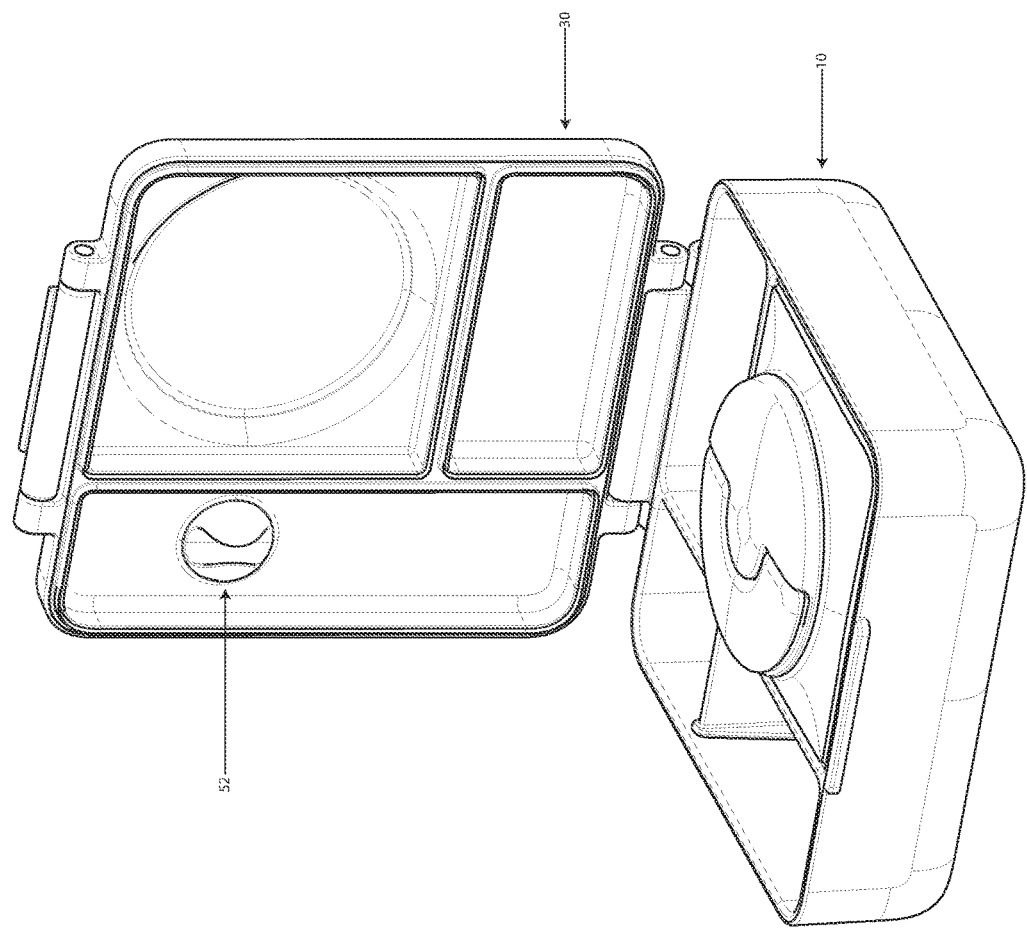
FIG. 8 is a view of a utensil receptacle for the food storage container of FIG. 1.

FIG. 8 is a view of a container having a utensil receptacle 52. In this example, the utensil receptacle 52 can be formed in lid compartment 36. This receptacle can be made of soft material, for example silicon or TPE, and is affixed to the lid 30. The receptacle 52 can be any shape, and in one example can have an overall semispherical shape that defines a groove formed therein to retain a utensil. The groove can be any shape to accommodate a utensil, and in this example can define a substantially circular or elliptical cross section in with respect to a longitudinal direction of the groove. The receptacle can be positioned in any of the lid compartments (including the lid compartment that defines the extruded shape 303).

Figure 9:
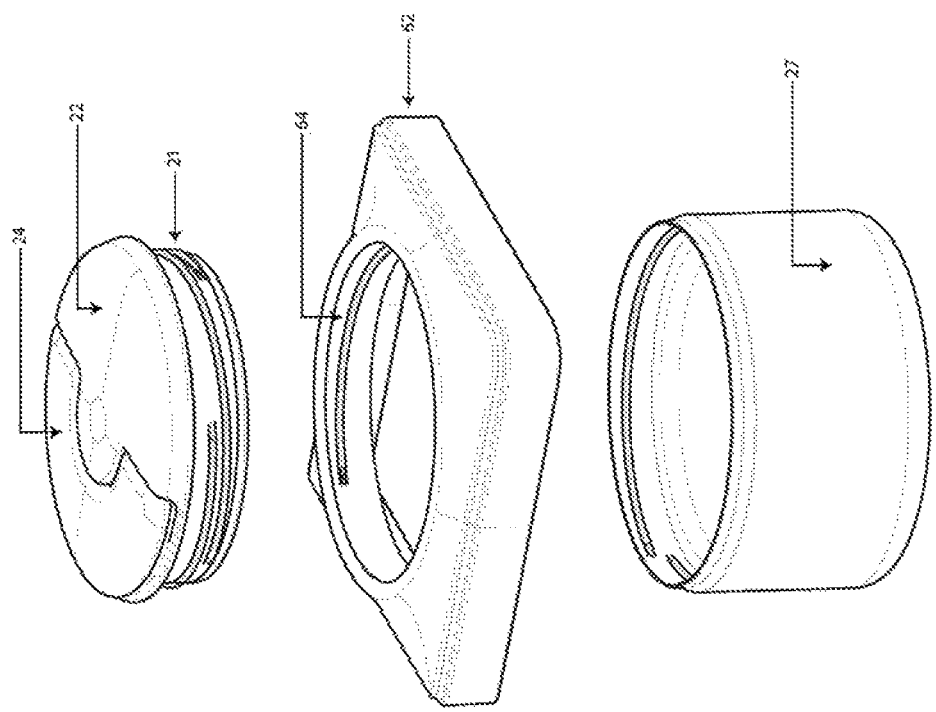
FIG. 9 is an alternate embodiment of an insulated component assembly.
Figure 9A:
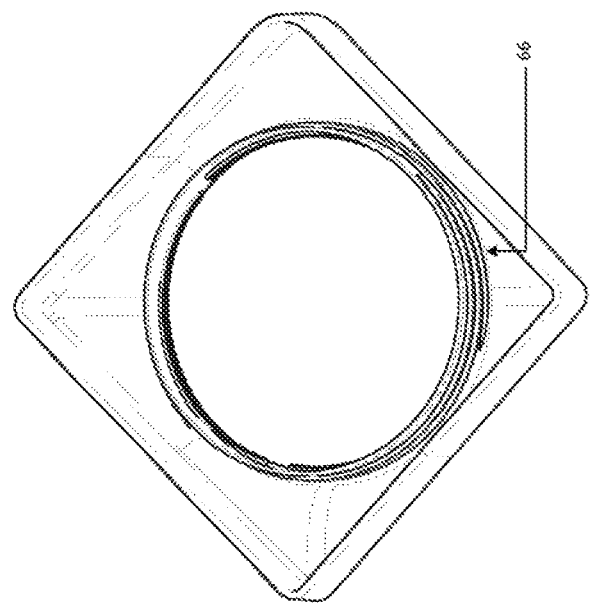
FIG. 9A is a top perspective view of the securing insert for the insulated component assembly of FIG. 9.

FIG. 9 shows an exploded view of an insulated component 27, walled securing insert 62 and the insulated component lid 22. The walled securing insert 62 has inner threads 64 and outer threads 66 as seen in FIG. 9A. The outer threads 66 engage with the inner threads of the insulated component 27 to create a tight lock. The inner thread 64 engages with the insulated component lid 22 to create a water tight seal with elastomeric sealing gasket 21. The walled securing insert 62 can be press fit into compartment 18 in the bottom tray. In this regard, the walls can extend vertically within the compartment of the container 1 and be substantially flush therewith, allowing for the insert 62 to be secured within the compartment. Note that while a threaded closure is used, another acceptable closure arrangement (e.g. various snap fits) or a modified thread arrangement—e.g. interrupted threads or a bayonet-type locking system can be employed as appropriate.

Figure 10:
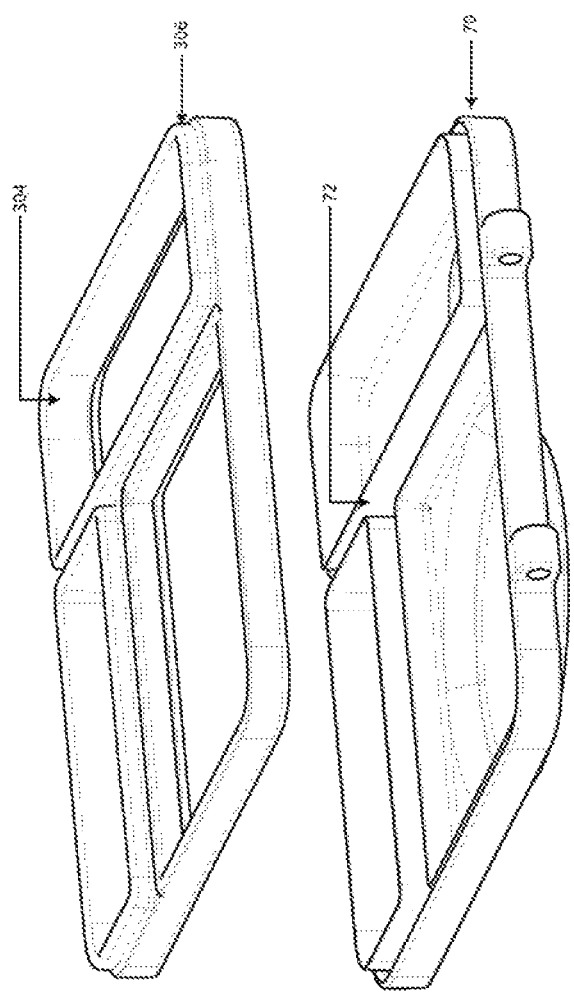
FIG. 10 is a view of the sealing gasket on the lid of the food storage container of FIG. 1.

FIG. 10 is an exploded view of a box lid 70 and a gasket 304. The gasket 304 can be made of any material, such as a soft, flexible material (e.g., silicone, TPE, TPU). A slot 72 can be defined by one or more walls that run along the perimeter of the box lid 70 and in correspondence with the dividing wall 12. The slot 72 can be shaped to receive the gasket 304 on the box lid 70. The gasket 304 can be shaped to fit compartments 14, 16, 18, making each of these compartments water tight as well as rendering the perimeter of the food storage container 1 water tight.

In operation, when the lid 70 and gasket 304 are assembled and the user wishes to close the food storage container 1, the lid 70 can be brought into contact with the tray 10. In this regard, raised portions 306 can come into contact with an upper surface of dividing wall 12. The raised portion 306 can have any shape, and in one example can have a substantially U-shaped cross section. Upon application of force to close the lid with the tray and by virtue of the force exerted by the latch assembly 38 and the force of the hinge assembly 40, force is exerted on the U-shaped raised portions. Such force causes the U-shaped portion to elastically deform, e.g., a reduction of thickness and an increase in length, to accommodate the force. This deformation provides a water-tight seal between compartments in the food storage container as well as a water-tight seal with respect to an exterior of the food storage container.

FIG. 11 is a view of the ice pack 80 shown installed in the lid of the container. The ice pack 80 (also shown in top and bottom perspective views in FIG. 11A) can be in any corresponding shape to be housed in lid compartments 32, 34, 36. The ice pack can fit lid compartments 32, 34, 36 through the use of a suction mechanism 82. A release button 84 on the front face of the ice pack 80 can release the suction hold, thereby releasing the ice pack 80 from the lid compartments 32, 34, 36. Although depicted as being housed within lid compartments 32, 34, 36, the ice pack 80 can also be in any corresponding shape that fits compartments 14, 16, 18. Although depicted as adhering to the lid compartment 32, 34, 36 using a suction mechanism 11, any type of mechanism can be employed to allow for a secure fit. In one example, the ice pack 80 can be pressure fit into lid compartments 32, 34, 36.

The icepack can comprise a plastic exterior housing that can be at least partially filled with one or more of water, refrigerant gel, or any other type of liquid. In one example, the contents inside the icepack are non-toxic such that, if the icepack leaks during storage, the contents of the food storage container are not contaminated. In operation, the icepack can be placed inside a cold environment (e.g., freezing or below) and can be subsequently placed inside the food storage container at the time of assembly. In another example, the entire food storage container and ice pack assembly can be placed in the cold environment to bring the icepack to the appropriate cold temperature.

The advantages of the present disclosure include, without limitation, the ability to store foods at various temperatures in the same food storage container so that the user can have, for example, a hot main entrée and room temperature side dishes such as vegetables or fruit. Modular features such as the removable divider and the insulated component allow flexibility so that the food storage container can accommodate any combination of food item that users wish to pack. The opening lever makes the insulated component lid easy to open, especially handicapped, elderly, or young children who lack the hand strength to twist off a circular threaded lid. The food storage container and its compartments are water tight, preventing spills and leaks that can be unpleasant for users. The food storage container has an integral hinge, latch and handle so that it can be transported easily.

Broadly stated, the present disclosure is a food storage container with an insulated component to maintain foods at substantially constant temperature over a relatively long period of time. Moreover, it should be clear that the illustrative system and its components/sub-components collectively and individually provide a superior modality for the organization, storage, transport and presentation of a meal to a user at a variety of locations, and under a range of conditions. The system's unique design and arrangement also allows for relatively trouble-free use by small children, the elderly and physically challenged.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Likewise, while polymer is used to construct various items, such as vessels, an alternate material, such as stainless steel, aluminum, glass, and the like can be used for all or part of such items in alternate embodiments. Accordingly, this description is meant to be taken only by way of example, and not to otherwise limit the scope of this invention.

What is claimed is:

1. A food storage system, comprising:
    a food storage container defining a plurality of compartments, the food storage container comprising an upper lid and a lower lid configured to enclose an insulated component and comprising a retaining gasket disposed along a perimeter of the food storage container and between the upper lid and lower lid; and
    an insulated component assembly, comprising:
        an insulated component defining a volume for storing a food, the insulated component comprising an inner wall and an outer wall with an insulating material disposed therebetween, the insulated component defining a first engagement feature and a second engagement feature,
        a securing insert that engages with the insulated component, the securing insert configured to be received by the food storage system, the securing insert defining a third engagement feature that engage directly with the first engagement feature of the insulated component, and
        an insulated component lid defining a fourth engagement feature that removably engage directly with the second engagement feature of the insulated component and allows access to the volume for storing the food in the insulated component.

2. The food storage system of claim 1, wherein the first engagement feature comprises negative locking features defined by the insulated component.

3. The food storage system of claim 2, wherein the third engagement feature comprises positive locking features defined by the securing insert.

4. The food storage system of claim 1, wherein the second engagement feature comprises a first plurality of threads defined by the insulated component.

5. The food storage system of claim 4, wherein the fourth engagement feature comprises a second plurality of threads defined by the insulated component lid.

6. The food storage system of claim 1, wherein the insulated component lid comprises a rotatable opening lever to facilitate engagement and disengagement of the insulated component to and from the insulated component lid.

7. The food storage system of claim 6, wherein a rotatable open lever is configured to rotate 90 degrees.

8. The food storage system of claim 1, wherein the insulating layer comprises at least one of air, expanded polystyrene, a plastic honeycomb, or a vacuum.

9. The food storage system of claim 1, wherein the retaining gasket creates a water-tight seal around the perimeter of the food storage container between the upper lid and the lower lid.

10. The food storage system of claim 9, wherein the retaining gasket creates a water-tight seal between the plurality of compartments.

11. The food storage system of claim 1, wherein the retaining gasket comprises silicone.

12. The food storage system of claim 1, wherein the retaining gasket comprises thermoplastic elastomer.

13. The food storage system of claim 1, wherein the retaining gasket comprises thermoplastic polyurethane.

* * * * *